(12) United States Patent
Benavente

(10) Patent No.: US 12,123,693 B2
(45) Date of Patent: Oct. 22, 2024

(54) ARROW SHAFT WEAK SPINE DETECTOR

(71) Applicant: Jose A. Benavente, San Luis Potosi (MX)

(72) Inventor: Jose A. Benavente, San Luis Potosi (MX)

( * ) Notice: Subject to any disclaimer, the term of this patent is extended or adjusted under 35 U.S.C. 154(b) by 345 days.

(21) Appl. No.: 17/735,226

(22) Filed: May 3, 2022

(65) Prior Publication Data

US 2023/0358521 A1 Nov. 9, 2023

(51) Int. Cl.
*G01N 3/08* (2006.01)
*F42B 35/00* (2006.01)
*F42B 6/04* (2006.01)

(52) U.S. Cl.
CPC .............. *F42B 35/00* (2013.01); *G01N 3/08* (2013.01); *F42B 6/04* (2013.01); *G01N 2203/0019* (2013.01); *G01N 2203/04* (2013.01)

(58) Field of Classification Search
CPC .. F42B 35/00; F42B 6/04; G01N 3/08; G01N 2203/0019; G01N 2203/04
See application file for complete search history.

(56) References Cited

U.S. PATENT DOCUMENTS

| | | | |
|---|---|---|---|
| 3,163,305 A | 12/1964 | Stanton | |
| 3,333,474 A | 8/1967 | Hercher | |
| 3,791,039 A | 2/1974 | Allix | |
| 4,674,193 A | 6/1987 | Wertepny | |
| 5,533,272 A | 7/1996 | Bagwell | |
| 5,644,853 A | 7/1997 | Dixon | |
| 8,333,369 B2 | 12/2012 | Kozlik et al. | |
| 8,752,813 B2 | 6/2014 | Meyer | |
| 9,046,452 B1 | 6/2015 | Huang | |
| 9,228,820 B2 * | 1/2016 | Huang | G01B 5/285 |
| 10,247,649 B2 * | 4/2019 | Landwehr | F41B 5/148 |
| 11,774,333 B2 * | 10/2023 | McPherson | G01N 3/066 73/818 |
| 2010/0088043 A1 | 4/2010 | Weiss et al. | |
| 2010/0230880 A1 * | 9/2010 | Kozlik | F41B 5/143 269/9 |
| 2015/0226536 A1 | 8/2015 | Huang | |

(Continued)

FOREIGN PATENT DOCUMENTS

CN 105499322 4/2016

OTHER PUBLICATIONS

TEC-HRO SpineAligner, https://www.archerytalk.com/threads/tec-hro-spine-aligner.4452121/ (uploaded Apr. 22, 2022).

(Continued)

*Primary Examiner* — Freddie Kirkland, III
(74) *Attorney, Agent, or Firm* — Rathe Lindenbaum LLP

(57) ABSTRACT

An arrow shaft weak spine detector may include a first plate, a second plate, a first shaft retainer in a second shaft retainer. The second plate is spaced from the first plate to receive an arrow shaft therebetween and is movable along a first axis toward the first plate to compress the arrow shaft. The first shaft retainer is supported by the first plate to engage a first axial end on the arrow shaft. The first shaft retainer is rotatable about a second axis coincident or parallel to the first axis. The second shaft retainer is supported by the second plate to engage a second axial end of the arrow shaft and is rotatable about the second axis.

22 Claims, 13 Drawing Sheets

(56) References Cited

U.S. PATENT DOCUMENTS

2020/0240761 A1    7/2020  Song et al.
2024/0027316 A1*   1/2024  McPherson .............. G01N 3/08

OTHER PUBLICATIONS

Spine Alignment, Archery Talk Forum, (Dec. 8, 2020), https://www.archerytalk.com/threads/spine-alignment.5969668/ (uploaded Apr. 22, 2022).

PCT International Search Report for PCT/IB2352253 dated Oct. 12, 2023.

* cited by examiner

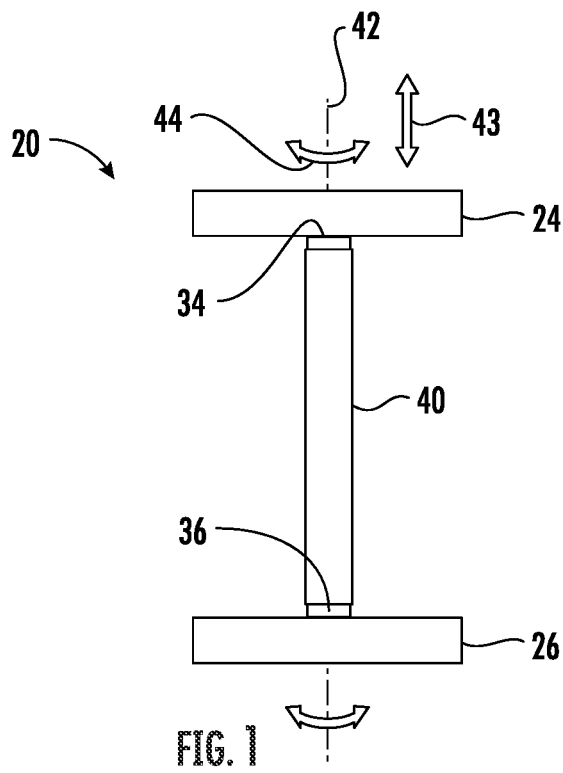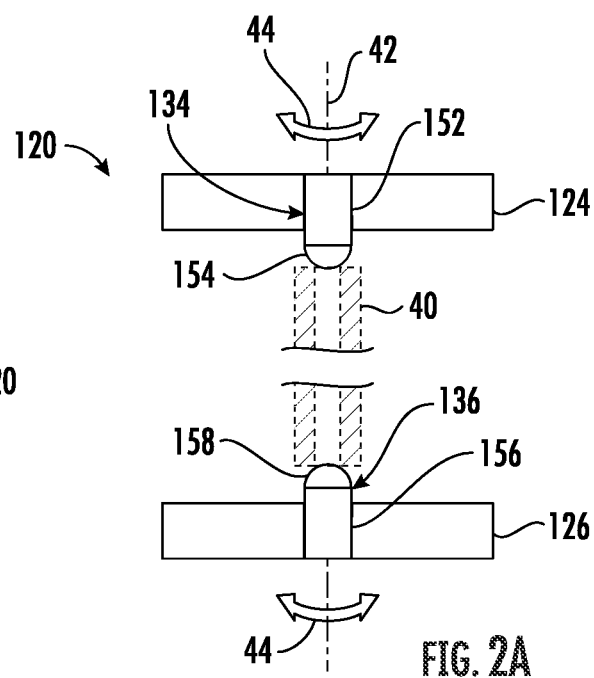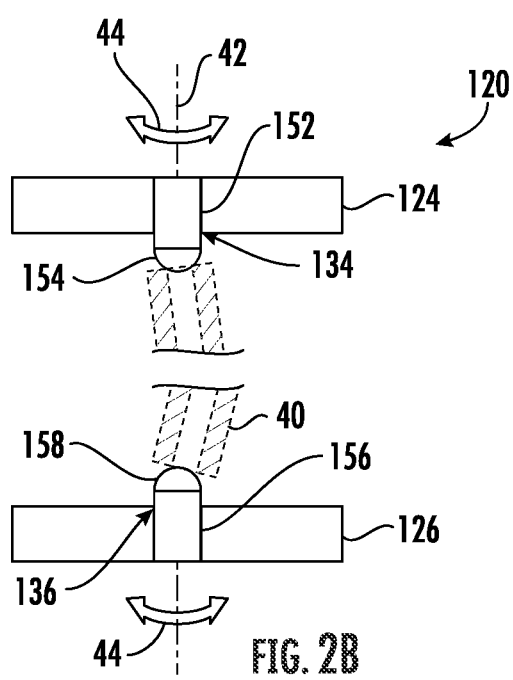

ARROW SHAFT WEAK SPINE DETECTOR

BACKGROUND

Archery involves the use of a bow string to propel an arrow towards a target. During initial release of the bow string, the shaft or tube of the arrow may undergo compression along its axis. Irregularities or variations in the construction of the shaft may result in weak spots. During its compression, the shaft may bend or deflect at such weak spots. Such deflection may impact the final trajectory of the arrow.

BRIEF DESCRIPTION OF THE DRAWINGS

FIG. 1 is a side view illustrating portions of an example arrow shaft weak spine detector with a retained arrow shaft an unbent or uncompressed state.

FIG. 2A is a sectional view illustrating portions of an example arrow shaft weak spine detector with a retained arrow shaft in an unbent or uncompressed state.

FIG. 2B is a sectional view illustrating portions of the example arrow shaft weak spine detector of FIG. 2A in a bent or compressed state.

Figure 3A:
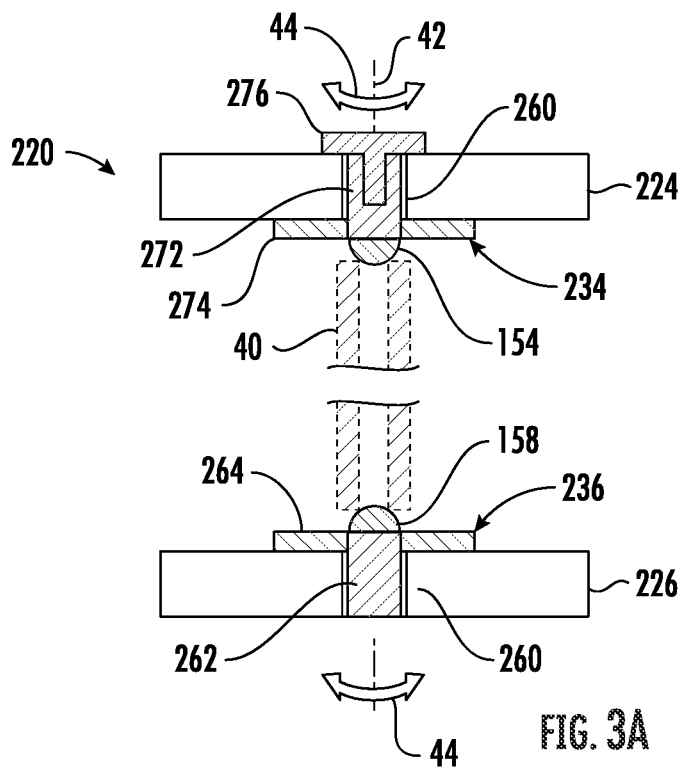
FIG. 3A is a sectional view illustrating portions of an example arrow shaft weak spine detector with a retained arrow shaft in an unbent or uncompressed state.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example arrow shaft weak spine detectors that facilitate the identification of any tendency for an arrow shaft to deflect in a particular direction due to weak spots in the shaft. Each arrow (and its shaft) may have a unique deflection tendency depending upon its construction and any resulting weak spots. By identifying a particular tendency of an arrow shaft to bend or deflect in a particular direction, an archer may be better able to preemptively account for such deflection when aiming the arrow at a particular target. For example, an archer may adjust his or her aim to the right when the archer knows that the arrow being used has a leftward trajectory due to deflection of the arrow. As a result, by knowing the tendency of the particular arrow to deflect in a particular direction, the archer may improve his or her target accuracy.

Disclosed are example arrow shaft weak spine detectors that may facilitate faster and more reliable detection of arrow deflection tendencies. The example arrow shaft weak spine detectors vertically compress at least one arrow shaft between opposing first and second compression plates. In some implementations, one of the compression plates is stationary while the other of the compression plates moves along a first axis (a compression axis) relative to the stationary compression plate. In some implementations, both compression plates move toward one another along the first axis to compress an arrow shaft therebetween. In some implementations, the axis along which the plate or plates move is vertical.

In some implementations, the movement of the first plate and/or second plate may be performed manually, such as with a crank and associated geared transmission (rack and pinion for example), mechanical jack or a manually pumped hydraulic or pneumatic jack. In some implementations, the movement of the first plate and/or second plate may be assisted with a powered mechanism such as an electric motor that rotates a threaded shaft passing through a threaded nut that is fixed against rotation and that is coupled to the first plate or the second plate to manually move the first plate or the second plate, an electric motor that rotatably drives a worm gear to linearly translate and move the first plate or the second plate, a hydraulic or pneumatic cylinder-piston assembly and hydraulic or pneumatic pump coupled to the first plate or the second plate, an electric solenoid coupled to the first plate or the second plate, and the like.

The first compression plate supports a first shaft retainer that engages a first axial end of the arrow shaft. The second compression plate supports a second shaft retainer that engages a second axial end of the arrow shaft. Both the first shaft retainer and second shaft retainer are rotatable about a second axis that is either coincident with or parallel to the first axis. Such rotation facilitates rotation of the arrow shaft while the arrow shaft is in a compressed state between the compression plates. As a result, the arrow shaft may be rotated to facilitate easier marking of the detected deflection direction on the arrow shaft.

In some implementations, the first shaft retainer and the second shaft retainer each include a bulbous surface configured to project into the tubular into of the arrow shaft. The bulbous surface of the first shaft retainer projects into the tubular interior of the arrow shaft at a first axial end of the arrow shaft while the bulbous surface of the second shaft retainer projects into the tubular interior of the arrow shaft a second axial end of the arrow shaft. The bulbous surface may be spherical, semi-spherical, oval or semi-oval. The bulbous surface facilitates secure retention of the arrow shaft between the two shaft retainers while permitting the arrow shaft to be rotated about the second axis while the shaft is in a compressed state. As a result, the arrow shaft may be rotated to facilitate easier marking of the detected deflection direction of the arrow shaft.

In those implementations in which the bulbous surface comprises a spherical surface, the hollow tubular end of the arrow shaft may have a greater freedom of movement in that the axial end of the arrow shaft may freely rotate about the spherical surface from an uncompressed position in which the end of the arrow shaft extends along the second axis to a state during compression in which the end of the arrow shaft extends along an axis oblique to the second axis. During compression of the arrow shaft, ends of the arrow shaft are not held in a state fixed along the second axis during compression. This may result in more accurate detection of arrow shaft deflection tendencies. The spherical surface, seated partially within the hollow tubular interior of the shaft, may also better accommodate variations in the inner diameter of a tubular shaft. The spherical surface further centers the longitudinal axis of the uncompressed shaft along the second axis which is coincident or parallel to the axis of compression.

In some implementations, at least one of the first shaft retainer and the second shaft retainer comprises a magnetically held spherical ball. Because the spherical ball is magnetically held to the first compression plate or the second compression plate, the spherical ball is rotatable, permitting the arrow shaft to not only be rotated about the second axis (coincident with or parallel to the first axis along which the compression occurs), but also be rotated about a third axis tangential to the first axis, facilitating bending or deflection of the shaft during compression. Said another way, because the balls are generally not constrained against rotation in any axis, the balls may retain the axial ends of the arrow shaft with less influence on the direction in which the arrow shaft bends under compression. The freely rotatable spherical balls permit the axial ends of the arrows to move so as to extend along axes oblique to the second axis (the original axis along which the ends extended prior to compression) without necessarily slipping or sliding over the spherical surface, without moving relative to the spherical surface, which holds the axial ends of the arrow shafts. As a result, the direction in which the arrow shaft bends under compression is less likely to be inconsistent due to interaction with the shaft retainers, providing potentially more accurate and reliable results.

In some implementations, rotation of the arrow shaft about the second axis before and during compression is provided by a cylinder rotatably supported about the second axis by the first plate and/or the second plate, wherein an end of the cylinder engages the axial end of the arrow shaft. In some implementations, the end of the cylinder may be bulbous. In some implementations, the end of the cylinder may be spherical. The bulbous or spherical end may project into the hollow tubular interior of the arrow shaft at the axial end of the arrow shaft.

In particular example implementations, at least one of the second shaft retainers is supported by their respective plate for movement relative to the respective plate in a direction parallel to or along the second axis. For example, while the first plate is vertically stationary, the first shaft retainer may be movable in directions along the second axis to release or engage the axial end of the shaft. While the second plate is vertically stationary, the second shaft retainer may be movable in directions along the second axis to release or engage the axial end of the shaft. As a result, an arrow shaft may be loaded into the detector or withdrawn from the detector by moving at least one of the individual shaft retainers along the second axis without moving either of the two plates. An arrow shaft may be loaded or unloaded from between the plates with minimal or no bending of the arrow shaft.

During use of the detector, a particular arrow shaft may deflect in different directions relative to the first axis along which the compression is occurring. Because the shaft retainers are rotatable about the second axis, the arrow shaft may be rotated about the second axis to a position to facilitate marking of the arrow shaft. The deflection tendency of the individual arrow shaft may be marked or otherwise provided on the individual arrow shaft. The archer may then use the marking which indicates the deflection tendencies of the particular arrow, to preemptively adjust his or her aim of the arrow to account for such anticipated deflection of the arrow during firing of the arrow or to assure the group of arrows will bend identical while leaving the bow, thus increasing accuracy by compacting the grouping of the arrows downrange.

In some implementations, the first shaft retainer is one of a plurality of first shaft retainers supported by the first plate, wherein each of the plurality of first shaft retainers is rotatable about an axis parallel to the first axis and wherein the second shaft retainer is one of a plurality of second shaft retainers supported by the second plate, wherein each of the plurality of second shaft retainers is rotatable about an axis parallel to the first axis. The plurality of first shaft retainers and the plurality of second shaft retainers are vertically aligned with one another, each pair of first and second shaft retainers being aligned along a respective second axis parallel to the first axis. As result, the detector may concurrently identify deflection tendencies for multiple arrow shafts.

In some implementations, the plurality of first shaft retainers and the plurality of second shaft retainers extend about or encircle the first axis. As a result, the detector may concurrently detect deflection tendencies of a greater number of arrow shafts in a more compact arrangement. In some implementations, the first and second plates may be rotatable about the first axis, providing enhanced access to each individual arrow shaft being tested by the detector. During use of the detector, different arrow shafts, having different weak points, may deflect in different directions relative to the first axis along which the compression is occurring. Because the shaft retainers are rotatable about their second axes, each arrow shaft may be rotated about its respective second axis until all of the arrow shafts deflect in the same direction, such as where all of the arrow shafts deflect inwardly towards the first axis or directly outwardly away from the first axis. Once each of their shafts has been rotated to such a position, the deflection tendency of each individual arrow shaft may be marked or otherwise provided on the individual arrow shaft. The archer may then use the marking which indicates the deflection tendencies of the particular arrow, to preemptively adjust his or her aim of the arrow to account for such anticipated deflection of the arrow during firing of the arrow, or to assure the group of arrows will bend identical while leaving the bow, thus increasing accuracy by compacting the grouping of the arrows downrange.

In some implementations, the first plate and/or the second plate are slidably supported along a central shaft which extends along the first axis. The plurality of first and second shaft retainer pairs encircle the central shaft. In some implementations, central shaft may be provided with a plurality of circumferentially spaced channels which faced outwardly from the first axis and which are sized to partial deceive the sides of the arrow shafts when such arrow shafts are under compression. Such channels may limit any excessive bending or deflection of the arrow shafts and may inhibit the multiple arrow shafts from contacting one another during compression. In other implementations, the first and/are second compression plates may be cantilevered in opposite aligned positions, wherein one or both of the first and second plates is movably supported by at least one shaft that extends along an offset axis that is parallel to and spaced from the first axis.

In those implementations in which at least one of the first and second shaft retainers is movably supported by their respective plates relative to their respective plates in a direction along the second axis, the individual shaft retainers may be vertically adjusted to not only allow for easier loading and unloading of the arrow shaft, but also to accommodate slight differences in the axial lengths of the multiple individual arrow shafts being concurrently held between the two compression plates. This feature facilitates secure concurrent retention of multiple arrow shafts between the two plates even though the different arrow shafts may have slight variations in their axial lengths.

In some implementations, one or both of the first and second shaft retainers in each vertically aligned pair of shaft retainers is threadably supported (helical threads) by their respective plate, wherein rotation of the shaft retainer about the second axis also results in movement of the particular shaft retainer along the second axis. In some implementations, one or both of the first and second shaft retainers may be vertically slidable relative to the respective plate, wherein an additional fixing mechanism is provided to secure the vertically slidable shaft retainer in a selected vertical position relative to the respective plate.

For example, the first shaft retainer may be vertically slidable relative to the first plate, wherein the first plate includes a clamp or pinching mechanism which may be used to selectively pinch or clamp the slidable shaft retainer in place at a desired vertical position. The clamp or pinching mechanism may comprise an externally threaded locking pin threaded into the plate having a tip or end rotatable into and out of engagement with a side of these vertically slidable first shaft retainer. In some implementations, sides of the vertically slidable shaft retainer may include a series of vertically arranged detents, each detent configured to receive the tip of the locking pin such that the slidable first shaft retainer is held at a selected vertical position corresponding to the particular detent.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

FIG. 1 is a diagram schematically illustrating portions of an example arrow shaft weak spine detector 20. Weak spine detector 20 facilitates the identification of a weak spots along the axial length of an arrow shaft or shaft. Weak spine detector 20 facilitates the identification of any tendency for an arrow shaft/shaft to deflect in a particular direction due to weak spots in the shaft. The detected weak spot or deflection tendency of the arrow shaft may then be marked on the arrow shaft. By identifying a particular tendency of an arrow shaft to bend or deflect in a particular direction, an archer may be better able to preemptively account for such deflection when aiming the arrow at a particular target or to assure the group of arrows will bend identical while leaving the bow, thus increasing accuracy by compacting the grouping of the arrows downrange. Weak spine detector 20 comprises a first compression plate 24, a second compression plate 26, a first arrow shaft retainer 34 and a second arrow shaft retainer 36.

Compression plates 24 and 26 comprise two spaced apart members configured to receive an arrow shaft/shaft 40 therebetween. Plates 24 and 26 do not necessarily have top and/or bottom surfaces that or flat or planar. In the example illustrated, plate 24 is vertically above and opposite to plate 26. Plate 26 is movable along a compression axis 42, as indicated by arrows 43, either towards plate 24 to compress the arrow shaft 40 or away from arrow shaft 40 to bring arrow shaft 40 to an uncompressed state. Such movement of plate 24 may be achieved with manually applied force or may be achieved under power, such as through the use of electric, hydraulic or pneumatic powered translation mechanisms. In some implementations, plate 24 may additionally or alternatively be movable towards plate 26 along axes 42 to compress the arrow shaft 40 captured between plates 24 and 26.

Compression of arrow shaft 40 may result in arrow shaft 40 bending or deflecting in a radial particular direction, outward from axis 42, depending upon which side portion of arrow shaft 40 contains weak spots or is weaker. For example, a weak spot on the right side of arrow shaft 40 (as seen in FIG. 1) may result in arrow shaft 40 bending at the weak spot and bowing outwardly in a leftward direction. The detected deflection of arrow shaft 40 may then be marked on arrow shaft 40 to permit an archer to assure the group of arrows will bend identical while leaving the bow, thus increasing accuracy by compacting the grouping of the arrows downrange and also to predict subsequent deflection of all arrow shafts when they undergo temporary compression upon initial firing or release from the bow string. The archer may adjust his or her aim based upon the expected deflection of the arrow to potentially achieve more accurate and consistent target results.

The shaft retainers 34 and 36 assist in retaining the axial ends of the shaft 40 relative to the compression plates 24, 26 prior to compression and during compression. Shaft retainer 34 is supported by plate 24 to engage a first axial end of the arrow shaft 40. Shaft retainer 36 is supported by plate 26 to engage a second axial end of the arrow shaft 40. Shaft retainers 34 and 36 are each rotatable about a second axis, while the arrow shaft 40 is in a compressed state between plates 24 and 26, wherein the second axis is either coincident with the compression axis 42 or parallel to the compression axis 42. In the particular example, shaft retainers 34 and 36 are each rotatable about a second axis that is coincident with axis 42 as indicated by arrows 44. Because shaft retainers 34 and 36 are each rotatable about the second axis while arrow shaft 40 is compressed and bent or deflected in a particular direction, arrow shaft 40 may be rotated provide better access to the side of arrow shaft 40 for marking arrow shaft 40 with the detected deflection tendency of the particular arrow shaft.

FIGS. 2A and 2B illustrate portions of an example arrow shaft weak spine detector 120. FIG. 2A illustrates detector 120 secured to an example arrow shaft 40 with the arrow shaft 40 in an uncompressed state. FIG. 2B illustrates detector 120 secured to the example arrow shaft 40 with the arrow shaft 40 in a compressed state in which shaft 40 is bent. FIGS. 2 and 3 illustrate an example of how an arrow shaft retainer may be rotatable about a second axis (coincident to the compression axis 42) and may be provided with a spherical surface that may permit axial ends of the arrow shaft to pivot during bending or deflection for a potentially more accurate identification of the deflection tendency of the particular arrow shaft. Detector 120 comprises compression plates 124, 126 and shaft retainers 134 and 136.

Compression plates 124 and 126 are similar to compression plates 24 and 26 described above except that compression plates 124 and 126 are each specifically configured for rotation about axis 42. At least one of plates 124, 126 is vertically movable along compression axis 42 to compress an arrow shaft 40 therebetween.

Shaft retainers 134 and 136 are similar to one another. Shaft retainer 134 comprises a cylindrical tube or shaft 152 and a tip 154. Similarly, shaft retainer 136 comprise a cylindrical tube or shaft 156 and a tip 158. Shafts 148 and 150 are affixed to plates 124 and 126 and project from plates 124 and 126, respectively. Rotation of plates 124 and 126 results in rotation of shafts 148 and 150, respectively.

Tips 154 and 158 engage opposite axial ends of shaft 40 to retain shaft 40 prior to compression of shaft 40 as shown in FIG. 2A and to retain shaft 40 during compression of shaft 40 as shown in FIG. 2B. In the example illustrated, each of tips 154 and 158 has a spherical surface. As shown in FIG. 2A, the spherical surface is partially received within the hollow tubular interior of shaft 40.

Due to their spherical shapes, each of tips 154 and 158 naturally center shaft 40 along the second axis, compression axis 42, prior to compression of shaft 40. As shown may FIG. 2B, during compression of shaft 40, the spherical surface of tips 154 and 158 permit the axial ends to slide along or about the spherical surface, rotating or pivoting about the spherical surface. As a result, shafts 40 may more easily bend or deflect with lesser amounts of compressive force to indicate the deflection tendency of the particular arrow shaft 40. In some implementations where tips 154 and 158 are spherical, plates 124 and 126 may not necessarily rotate about compression axis 42, wherein arrow shaft 40 may instead be rotated about the spherical surface provided by tips 154 and 158. In other implementations, tips 154 and 158 may have other shapes such as bulbous shapes or pointed shapes.

Figure 3B:
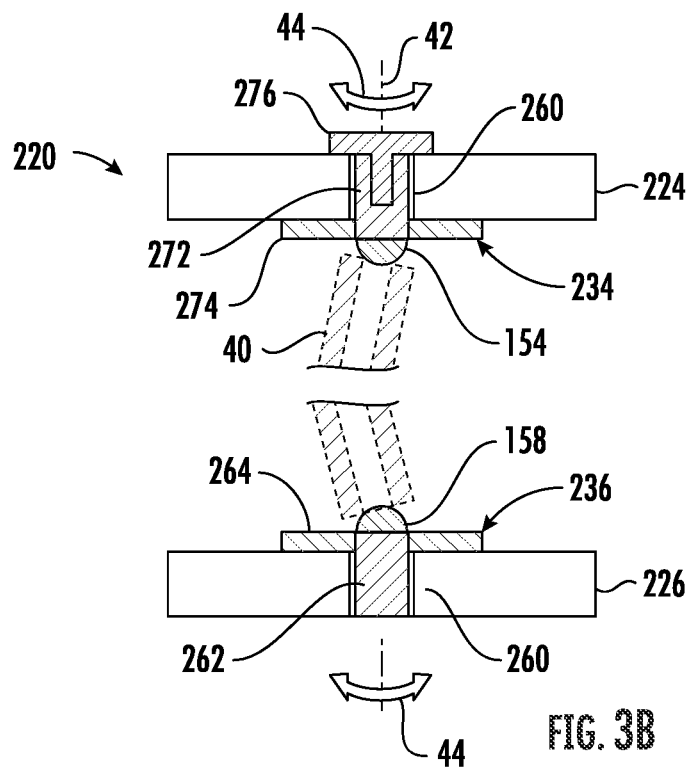
FIG. 3B is a sectional view illustrating portions of the example arrow shaft weak spine detector of FIG. 3A in a bent or compressed state.

FIGS. 3A and 3B are diagrams illustrating portions of an example arrow shaft weak spine detector 220. FIG. 3A illustrates detector 220 secured to an example arrow shaft 40 with the arrow shaft 40 in an uncompressed state. FIG. 3B illustrates detector 220 secured to the example arrow shaft 40 with the arrow shaft 40 in a compressed state. FIGS. 3A and 3B illustrate an example of how an arrow shaft retainer may be rotatable about a second axis (coincident or parallel to the compression axis 42) and may be provided with a spherical surface that may permit axial ends of the arrow shaft to pivot during bending or deflection for a potentially more accurate identification of the deflection tendency of the particular arrow shaft.

Weak spine detector 220 comprises compression plates 224, 226 and shaft retainers 234, 236. Compression plates 224 and 226 are similar to compression plates 124 and 126 described above except that compression plates 224 to 26 each comprise a bore 260 for rotatably receiving one of shaft retainers 234, 236.

Shaft retainer 234 cooperates with shaft retainer 236 to secure arrow shaft 40 therebetween prior to compression as shown in FIG. 3A and during compression as shown in FIG. 3B. Shaft retainer 236 comprises shaft 262, rim 264 and spherical surface at tip 158 (described above). Shaft 262 is rotatably received within bore 260. Rim 264 outwardly projects from shaft 262 and rests upon an upper face of plate 226. Rim 264 supports retainer 236 on plate 226. Spherical surface of tip 158 projects above rim 264 and is configured to be partially received within the hollow tubular interior of a lower end of arrow shaft 40.

Shaft retainer 236 comprises shaft 272, rim 274, supports 276 and spherical surface of tip 154 (described above). Shaft 272 is slidably received within bore 260 of compression plate 224. Rim 274 outwardly projects from shaft 272 on a lower side of compression plate 224. Rim 274 supports retainer 234 against plate 224.

Support 276 movably retains retainer 234 on plate 224. Said another way, support 276 prevents retainer 234 from falling out of plate 224 in the absence of arrow shaft 40. In the example illustrated, support 276 comprises a threaded bolt having a threaded shaft received within a threaded bore of shaft 272 and a wider head extending over an upper surface of plate 224. The wider head is sufficiently spaced from the upper surface of rim 274 such that retainer 234 may rotate about compression axis 42. In other implementations, support 276 may have other configurations. In some implementations, support 276 may be omitted such as where retainer 234 is vertically supported by arrow shaft 40 during use of detector 220 and is permitted to fall from compression plate 224 when not in use or is frictionally held within bore 260 of compression plate 224.

Spherical surface of tip 154 projects below rim 274 and is configured to be partially received within the hollow tubular interior of an upper end of arrow shaft 40. As discussed above, spherical surfaces of tips 154 and 158 permit arrow shaft 40 to be rotated about axis 42 during compression of arrow shaft 40 and also permit the axial ends of arrow shaft 40 to pivot about the spherical surfaces of tips 154, 158.

Figure 4A:
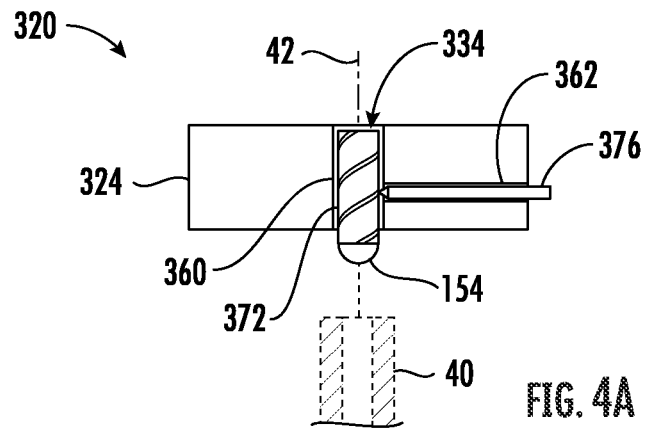
FIG. 4A is a sectional view illustrating portions of an example arrow shaft weak spine detector with an example shaft retainer disengaged from an arrow shaft.
Figure 4B:
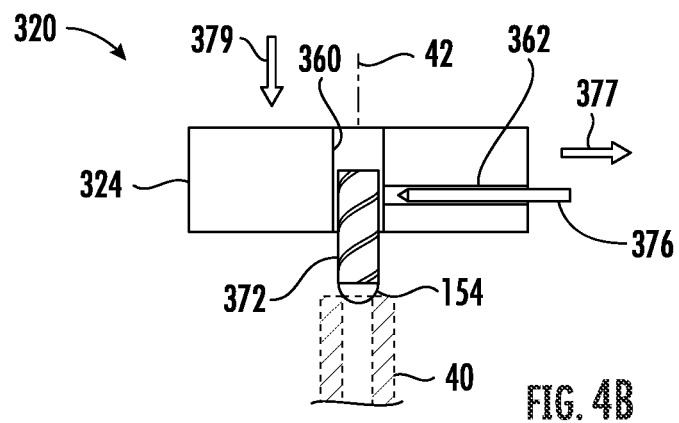
FIG. 4B is a sectional view illustrating portions of the example arrow shaft weak spine detector of FIG. 4A with the example arrow shaft retainer engaging the arrow shaft.
Figure 4C:
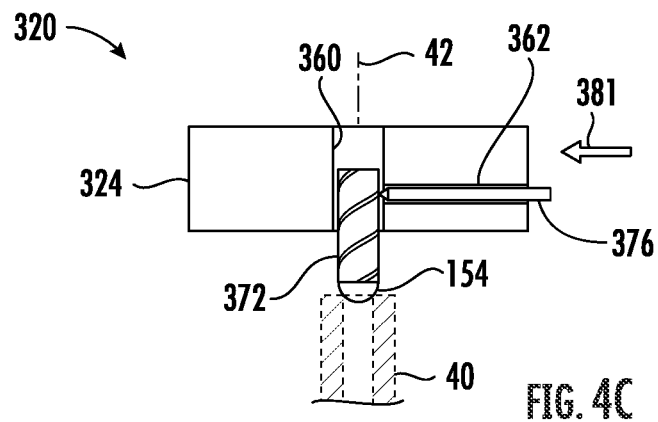
FIG. 4C is a sectional view illustrating portions of the example arrow shaft weak spine detector of FIG. 4B with the example shaft protector engaging arrow shaft and vertically locked.

FIGS. 4A, 4B and 4C are sectional views illustrating portions of an example arrow shaft weak spine detector 320. FIGS. 4A, 4B and 4C illustrate an example of how an individual shaft retainer may be rotatable about a second axis that is coincident with or parallel to a compression axis and that may also be translatable along the second axis relative to the supporting compression plate to accommodate variations in shaft lengths and to release the arrow shaft without movement of the compression plate. Weak spine detector 320 is similar to weak spine detector 320 described above except that weak spine detector 320 comprises compression plate 324 and shaft retainer 334 in place of compression plate 224 and shaft retainer 234 described above. Those remaining components of weak spine detector 320 which correspond to components of weak spine detector 220 are numbered similarly and/or are shown in FIGS. 3A and 3B.

Compression plate 324 is similar to compression plate 224 except that compression plate 324 comprises vertical bore 360 and transverse bore 362. Vertical bore 360 is similar to bore 260 in that bore 360 vertically extends through compression plate 324 and rotatably supports portions of shaft retainer 334 for rotation about compression axis 42 or another axis that is parallel to compression axis 42. Transverse bore 362 extends through compression plate 324 to a side of vertical bore 360.

Shaft retainer 334 comprises shaft 372, spherical surface of tip 154 (described above) and vertical retainer 376. Shaft 372 extends through and is rotatably received within bore 360. The spherical surface of tip 154 is sized to be partially inset into the hollow tubular axial end of an upper end of arrow shaft 40. Vertical retainer 376 comprises a pin, shaft, bolt or other member extending through and selectively movable within transverse bore 362 between a first shaft engaging position (shown in FIGS. 4A and 4B) and a second disengaged position (shown in FIG. 4B). Vertical retainer 376 retains shaft 372 and spherical surface of tip 154 in a selected vertical position. In some implementations, vertical retainer 376 has a pointed tip bearing against shaft 372. In some implementations, the side of shaft 372 may include a series of vertically spaced detents 373 extending into shaft 372 along axis 42 for receipt of the pointed tip of retainer 376. In some implementations, detents may be in the form of a series of vertically spaced annular grooves extending the shaft 372 along axis 42 for receipt of the pointed tip of retainer 376.

In some implementations, retainer 376 may include external threads which engage internal threads of bore 362, wherein rotation of retainer 376 results in movement of the pointed tip of retainer 376 into and out of engagement with shaft 372. In other implementations, retainer 376 may be slidable within bore 362 and resiliently biased by a compression spring towards the shaft engaging position, wherein retainer 370 may be pulled to the shaft disengaged position against the compression spring. In yet other implementations, retainer 376 may be moved between and retained in either the shaft engaging position and the shaft disengaging position by other mechanisms.

Because spherical surface of tip 154 is vertically movable along axis 42 and may be selectively retained in one of a plurality of available vertical positions, shaft retainer 334 may accommodate variations in the axial length of arrow shaft 40. In addition, spherical surface of tip 154 may more easily engage the end of an arrow shaft when loading or unloading an arrow shaft from weak spine detector 320. For example, an arrow shaft 40 may be more easily unloaded from weak spine detector 320 by raising spherical surface of tip 154 out of engagement with arrow shaft 40, without movement of either of compression plates 324 or 226.

FIGS. 4A, 4B and 4C illustrate use of shaft retainer 334. FIG. 4A illustrates an arrow shaft 40 positioned below spherical surface 154 with the spherical surface of tip 154 positioned out of engagement with the arrow shaft 40. FIG. 4B illustrates retainer 376 moved to the right as indicated by arrow 377 and further illustrates shaft 372 and spherical surface of tip 154 being lowered by arrow 379 along axis 42 (or another axis parallel to the compression axis) into engagement with the axial end of arrow shaft 40, wherein spherical surface 15 is partially inset into the hollow tubular interior of arrow shaft 40.

FIG. 4C illustrates retainer 376 being moved within bore 362 in the direction indicated by arrow 381 to lock shaft 372 in the selected vertical position. Thereafter, compression plate 226 and/or compression plate 324 may be moved to compress the arrow shaft 40 between such compression plates. Upon identification of the deflection tendency of the particular arrow during such compression, and marking of the arrow with the detected deflection tendency, the compression plates may once again be moved apart such that arrow shaft 40 is no longer in compression or is in a slight degree of compression with limited bending of arrow shaft 40. At such time, the process shown in FIGS. 4A, 4B and 4C may be reversed to permit arrow shaft 40 to be withdrawn from weak spine detector 320. In implementations where compression plate 324 is used to concurrently compress multiple, individual shafts, retainers 334 may be actuated to individually release particular arrow shafts 40.

Figure 5:
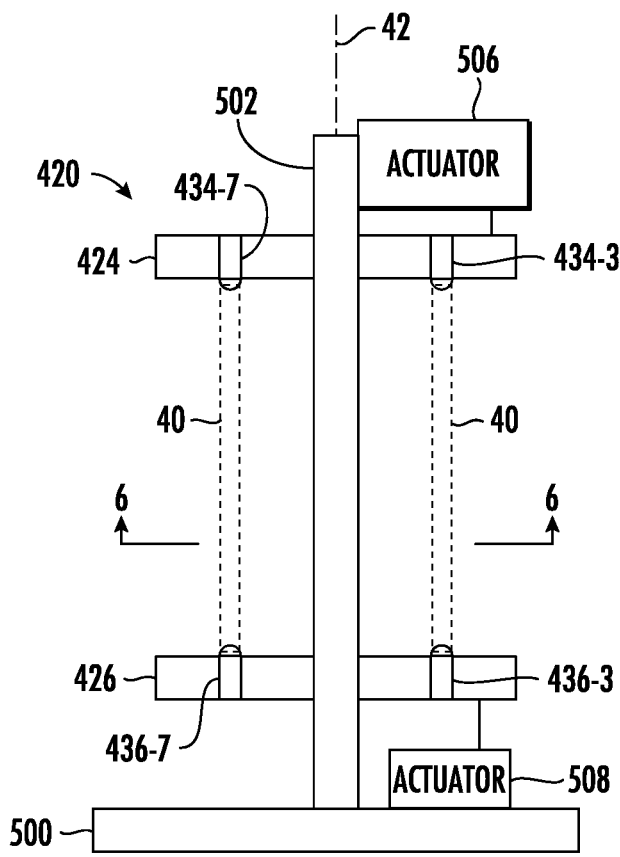
FIG. 5 is a sectional view illustrating portions of an example arrow shaft weak spine detector retaining arrow shafts in an unbent or uncompressed state.
Figure 6:
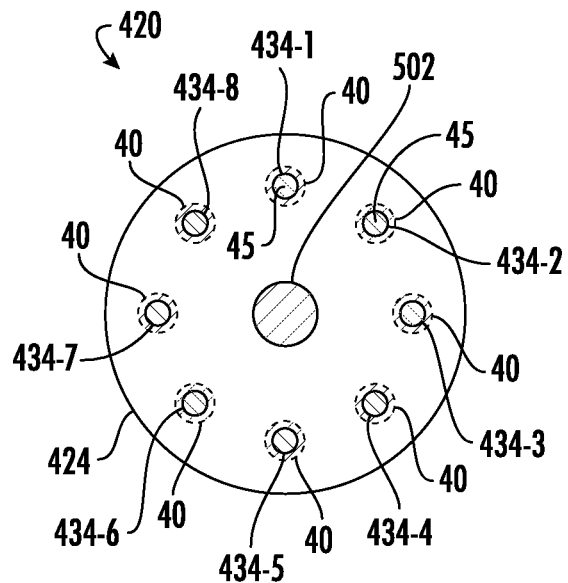
FIG. 6 is a sectional view of the arrow shaft weak spine detector of FIG. 5 taken along line 6-6.

FIGS. 5 and 6 illustrate portions of an example arrow shaft weak spine detector 420 supporting a multitude of arrow shafts 40. FIGS. 5 and 6 illustrate an example of how a weak spine detector may be used to concurrently identify the deflection tendencies of multiple arrow shafts. Weak spine detector 420 comprises base 500, vertical shaft 502, compression plate 424, compression plate 426, shaft retainers 434-1, 434-2, 434-3, 434-4, 434-5, 434-6, 434-7 and 434-8 (collectively referred to as shaft retainers 434), shaft retainers 436-1, 436-2, 436-3, 436-4, 436-5, 436-6, 436-7 and 436-8 (collectively referred to as shaft retainers 436) (only shaft retainers 436-3 and 436-7 being shown in FIG. 5), actuator 506 and actuator 508.

Base 500 supports the remaining components of weak spine detector 420. Vertical shaft 502 projects from base and vertically shafts movement of compression plates 424 and 426 along compression axis 42. In some implementations, vertical shaft 502 may comprise a cylinder along which compression plates 424 and 426 are slidable. In other implementations, shaft 502 may have other configurations.

Compression plate 424 and compression plate 426 are each movable along vertical shaft 502 between various relative vertical positions to vertically receive arrow shafts 40 therebetween and to compress such arrow shafts 44 detecting identifying the deflection tendencies of the individual arrow shafts 40. In the example illustrated, compression plates 424 and circle vertical shaft 502, supporting a multitude of shaft retainers 434 and 436 about vertical shaft 502 and compression axis 42.

Shaft retainers 434 and 436 are arranged in opposite pairs about compression axis 42. Each pair of retainers 434, 436 retains an arrow shaft 40 therebetween along a second axis 45 that is parallel to compression axis 42. In some implementations, shaft retainers 434 and 436 are similar to shaft retainers 134 and 136, respectively, described above. In some implementations, shaft retainers 434 and 436 is similar to shaft retainers 234 and 236, respectively, described above. In some implementations, shaft retainers 434 and 436 are similar to shaft retainers 334 and 224, respectively, described above. In yet other implementations, shaft retainers 434 and 436 may have other configurations.

Actuator 506 comprises a device to controllably move compression plate 424 along shaft 502 and along axis 42. In the example illustrated, actuator 506 is supported at a top portion of shaft 502. In other implementations, actuator 506 may be sorted by other brackets or surrounding framework of weak spine detector 420. Actuator 508 comprise a device to controllably move compression plate 426 along shaft 502 and along axis 42. Actuator 508 is illustrated as being supported by base 500. In other implementations, actuator 508 may be supported by other framework of weak spine detector 420.

In some implementations, actuator 506 and/or 508 are configured to independently move compression plates 424 and 426. In some implementations, actuators 506 and 508 may comprise manually powered actuators, such a crank and associated geared transmission (rack and pinion for example), a manual jack, or a manually pumped hydraulic jack. In some implementations, actuator 506 and/or 508 may comprise a powered mechanism such as an electric motor with a geared and/or belted transmission, a hydraulic or pneumatic cylinder-piston assembly and hydraulic or pneumatic pump, an electric solenoid or the like. In some implementations, actuators 506 and/or 508 may be operably coupled to plates 424 and 426, respectively, to move such plates along a stationary vertical shaft 502. In some implementations, plate 424 or plate 426 may be affixed to vertical shaft 502, wherein actuator 506 or actuator 508 vertically moves the vertical shaft 502 to vertically move. In some implementations, one of actuator 506, 508 may be omitted, such as where a single actuator moves both of plates 424, 426 towards one another, or away from one another. In some implementations, one of actuator 506, 508 may be omitted such as where one of such plates is stationary and the other of such places movable towards and away from the stationary compression plate.

Figure 7:
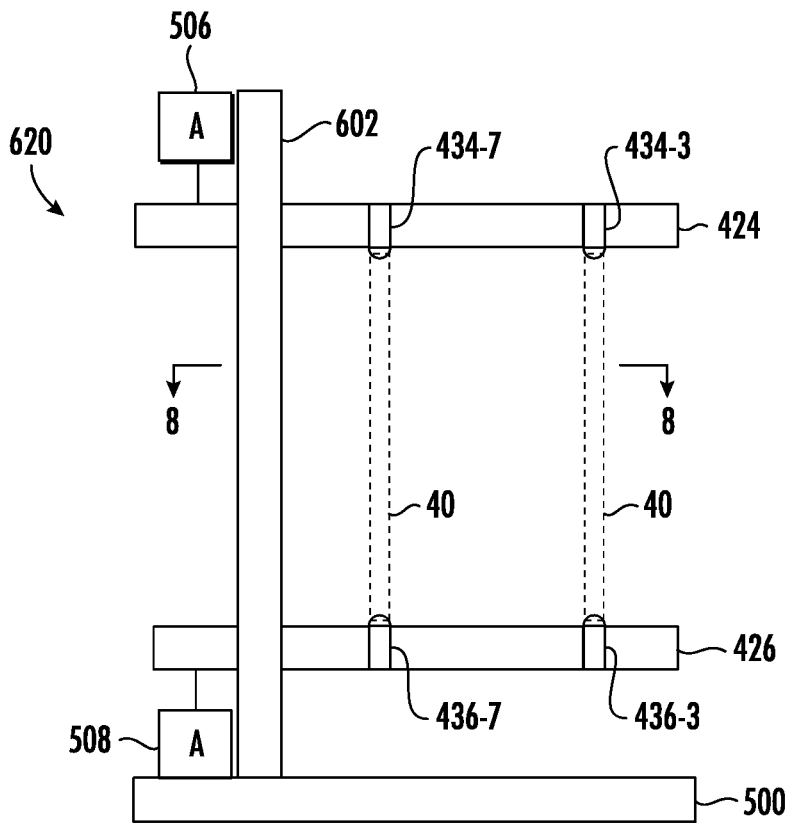
FIG. 7 is a sectional view illustrating portions of an example arrow shaft weak spine detector retaining arrow shafts in an unbent or uncompressed state.
Figure 8:
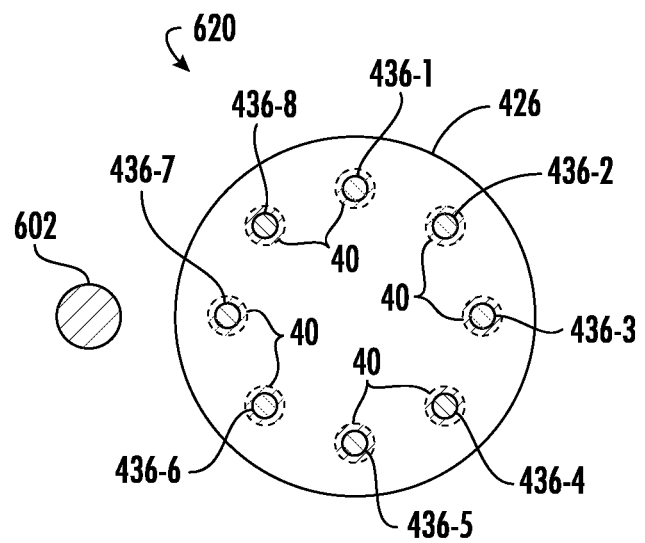
FIG. 8 is a sectional view of the arrow shaft weak spine detector of FIG. 7 taken along line 8-8.

FIGS. 7 and 8 are diagrams illustrating portions of an example arrow shaft weak spine detector 620. Weak spine detector 620 is similar to weak spine detector 420 described above except that compression plates 424, 426 are cantilevered from a vertical shaft 602. Those remaining components of arrow shaft weak spine detector 620 which correspond to components of arrow shaft weak spine detector 420 are numbered similarly and/or are shown in FIGS. 5 and 6. In some implementations, actuators 506, 508 vertically move compression plates 424 and 426, respectively, along shaft 602. In some implementations, one of actuator 506, 508 may be omitted, wherein a first one of the compression plates is affixed to shaft 602, wherein the shaft slides through an opening in the second one of the compression plates and wherein the remaining actuator moves the shaft 602 to move the first compression plate that is attached to the shaft 602 towards and away from the second compression plate.

Figure 9:
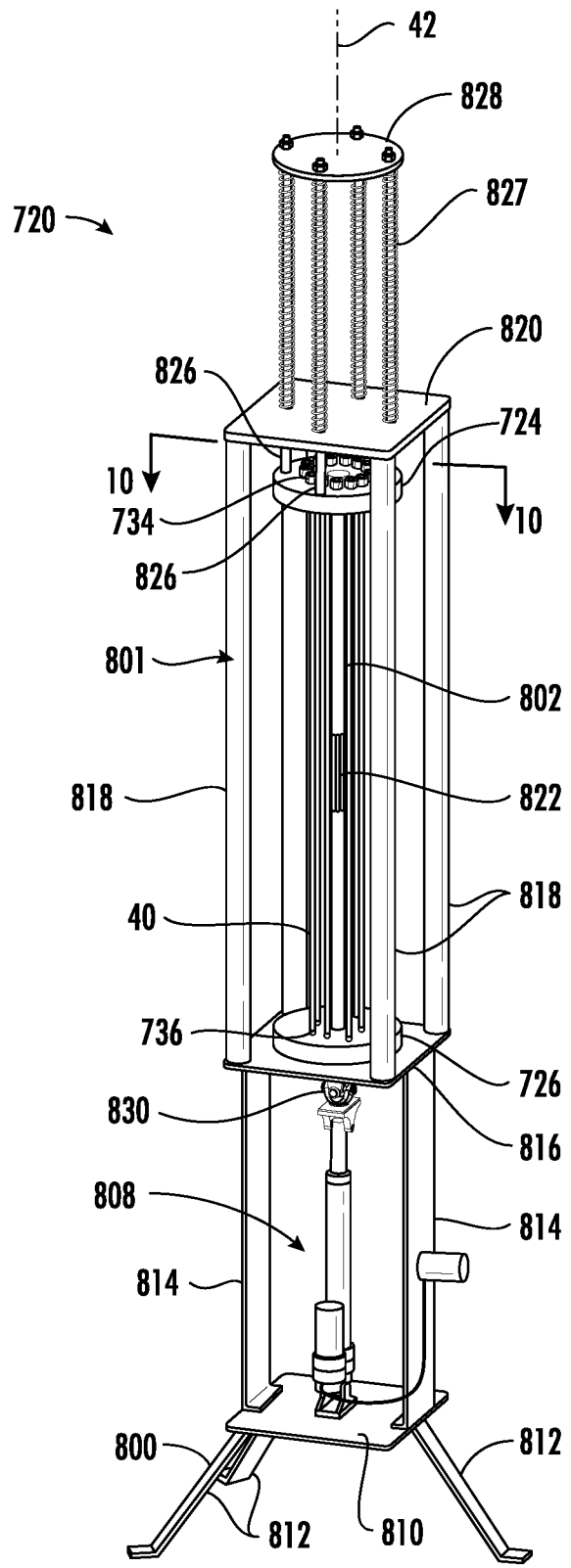
FIG. 9 is a perspective view illustrating portions of an example arrow shaft weak spine detector retaining arrow shafts in an unbent or uncompressed state.
Figure 10:
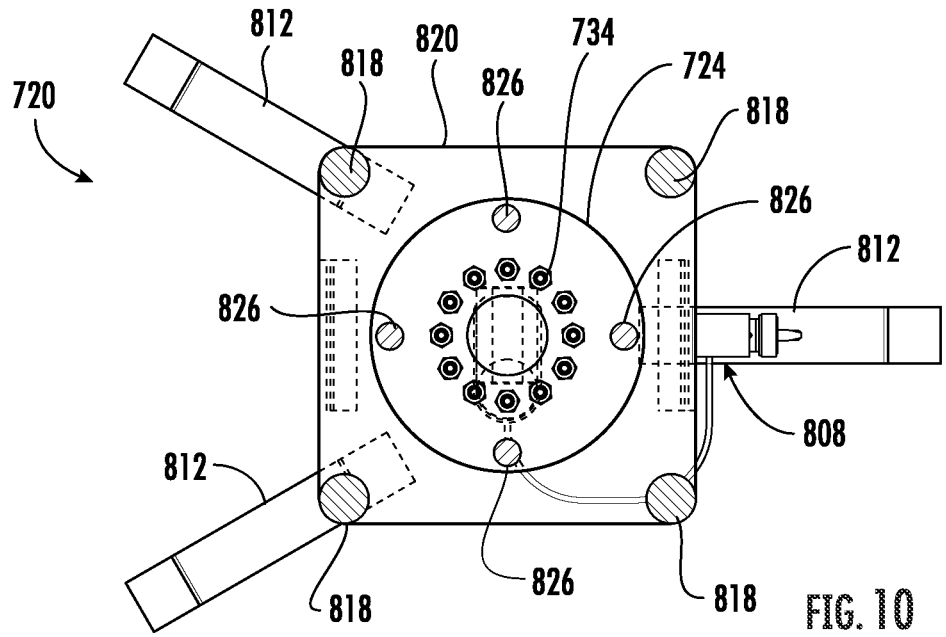
FIG. 10 is a top view of the example arrow shaft weak spine detector of FIG. 9 with portions being transparently illustrated.

FIG. 9 is a perspective view illustrating portions of an example arrow shaft weak spine detector 720 supporting a multitude of arrow shafts 40 in an uncompressed or unbent state. FIG. 10 is a bottom view of weak spine detector 720. Weak spine detector 720 facilitates the identification of a weak spots along the axial length of an arrow shaft or shaft. Weak spine detector 20 facilitates the identification of any tendency for an arrow shaft/shaft to deflect in a particular direction due to weak spots in the shaft. The detected weak spot or deflection tendency of the arrow shaft (also known as weak spine) may then be marked on the arrow shaft. By identifying a particular tendency of an arrow shaft to bend or deflect in a particular direction, an archer may be better able to preemptively account for such deflection when aiming the arrow at a particular target. Weak spine detector 720 comprises base 800, frame 801, vertical shaft 802, compression plate 724, compression plate 726 shaft retainers 734, shaft retainers 736 and actuator 808. facilitates the identification of a weak spots along the axial length of an arrow shaft or shaft. Weak spine detector 20 facilitates the identification of any tendency for an arrow shaft/shaft to deflect in a particular direction due to weak spots in the shaft. The detected weak spot or deflection tendency of the arrow shaft may then be marked on the arrow shaft. By identifying a particular tendency of an arrow shaft to bend or deflect in a particular direction, an archer may be better able to preemptively account for such deflection when aiming the arrow at a particular target. Weak spine detector 20 comprises a first compression plate 24, a second compression plate 26, a first arrow shaft retainer 34 and a second arrow shaft retainer 36.

Base 800 and frame 801 support the remaining components of weak spine detector 720. Base 800 comprises a lowermost platform 810. Frame 801 extends upwardly from base 800 and comprises support beams 814, middle platform 816, outer support posts 818, and top platform 820. Legs 812 support platform 810 which supports an actuator 808. Beams 814 support middle platform 816 which supports outer support posts 818. Outer support posts 818 project upwardly from platform 816 to platform 820. Platforms 816 and 820 vertically support shaft 802.

Figure 11:
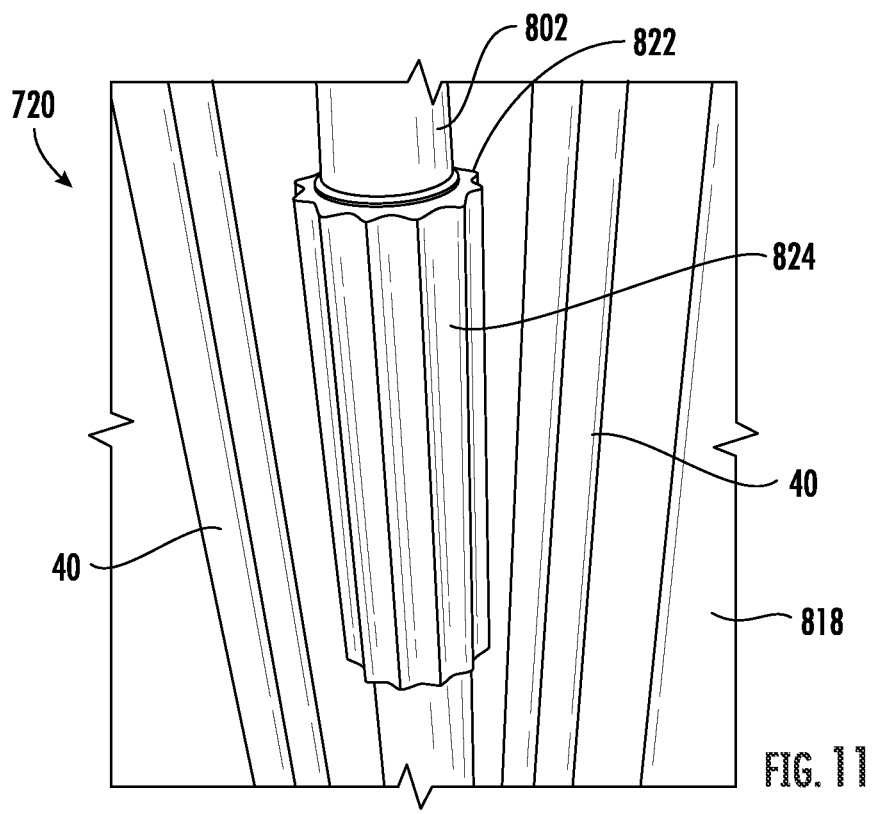
FIG. 11 is an enlarged fragmentary perspective view of portions of the example arrow shaft weak spine detector of FIG. 9.
Figure 12:
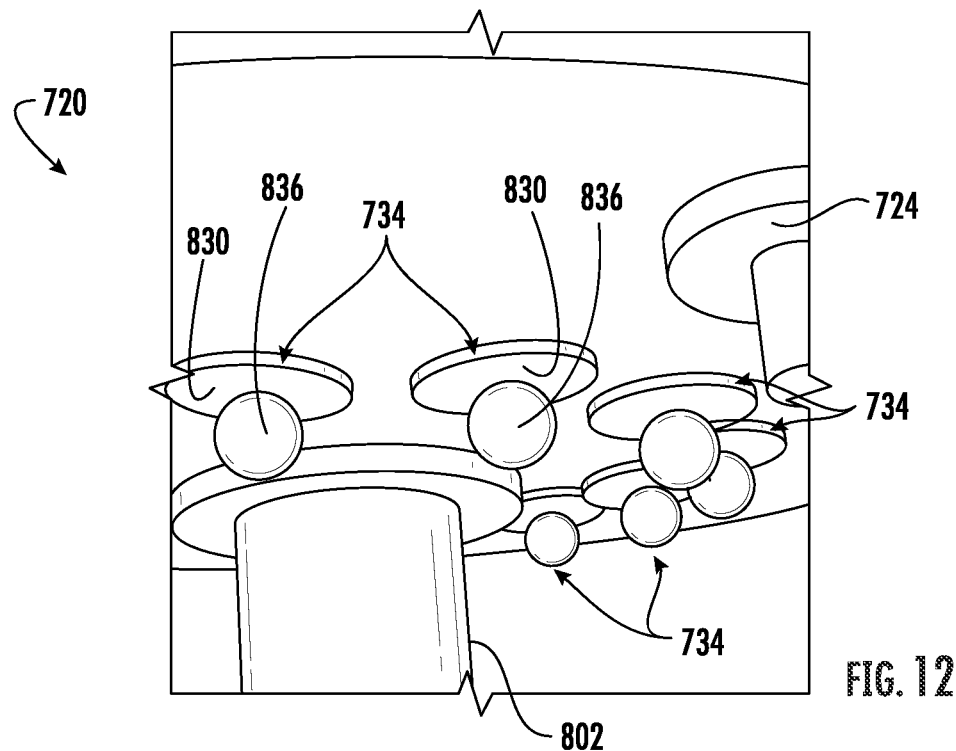
FIG. 12 is an enlarged fragmentary bottom perspective view of a lower side of a top compression plate of the example arrow shaft weak spine detector of FIG. 9.
Figure 13:
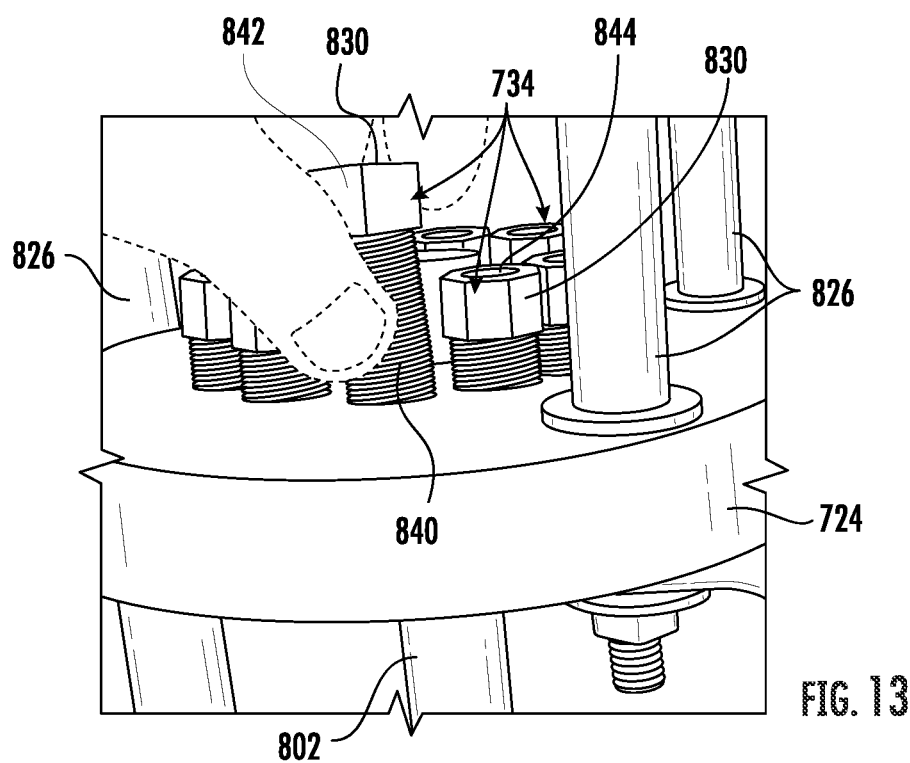
FIG. 13 is an enlarged fragmentary top perspective view of a top side of the top compression plate of the example arrow shaft weak spine detector of FIG. 9.

Vertical shaft 802 has an upper end secured to compression plate 724, such as with a bolt, and a lower end that slidably passes through compression plate 726 and lower platform 816 into a connected relationship with actuator 808. Actuator 808 raises and lowers vertical shaft 802 to raise and lower compression plate 724, moving compression plate 724 towards and away from compression plate 726 which either rests upon platform 816 or is vertically fixed. As shown by FIG. 11, vertical shaft 802 supports an outer sleeve 822 providing a plurality of vertical channels 824 which encircle the shaft 802. Each of the channels 824 is sized and located to receive an arrow shaft 40 when the particular arrow shaft 40 is sufficient compressed and oriented so as to deflect or bend inwardly towards compression axis 42.

Compression plate 724 is secured to shaft 8022 vertically move with vertical shaft 802. In the example illustrated, for vertical support posts 826 have lower and secured to compression plate 724 and operands affixed to top plate 828. Support posts 826 slidably passed through top platform 820. Support posts 826 inhibit dictation of compression plate 72 for about compression axis 42.

Compression springs 827 are vertically captured between top platform 820 and top plate 828. Compression springs 827 resiliently bias compression plate 724 in a direction away from compression plate 726. During compression of the arrow shafts 40, actuator 808 downwardly moves posts 802 through compression plate 726 and through lower platform 816 which lowers compression plate 724 towards compression plate 726. The lowering of compression plate 724 results in support posts 826 being moved downwardly through top platform 820 and lowers top plate 828 towards top platform 820, compressing springs 827. When compression plate 724 is to be once again raised, springs 827 resiliently return to an uncompressed state, assisting the raising of compression plate 724. In some implementations, springs 827 may be omitted. In some implementations, other mechanisms may be employed to inhibit rotation of compression plate 724 about compression axis 42.

Compression plate 724 supports shaft retainers 734. Compression plate 726 supports shaft retainers 736. Compression plates 724 and 726 receive the arrow shafts being evaluated therebetween.

Shaft retainers 734 cooperate with shaft retainers 736 to retain arrow shafts 40 therebetween prior and during compression. Shaft retainers 734 are supported by compression plate 724 and encircle vertical shaft and 802. Each of shaft retainers 734 is vertically aligned with and extends opposite to a corresponding one of shaft retainers 736 supported by compression plate 726. In the example illustrated, weak spine detector 720 is illustrated as comprising 12 shaft retainers 734 and their opposite corresponding shaft retainers 736. In other implementations, weak spine detector 720 may comprise a greater or fewer of such pairs of shaft retainers 734, 736.

Figure 14A:
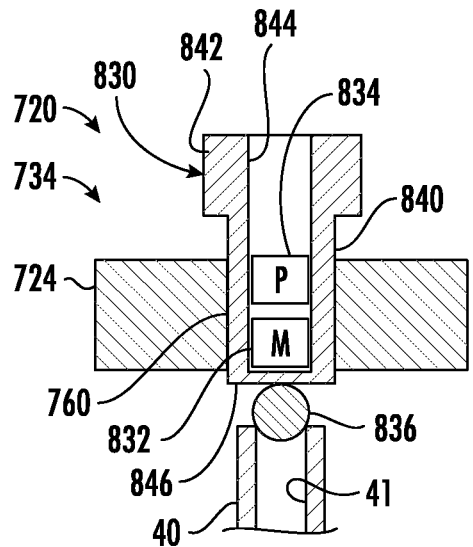
FIG. 14A is a sectional view of an individual shaft retainer supported by the example top compression plate of the example arrow shaft weak spine detector of FIG. 9.

FIGS. 12, 13, 14A, 14B and 14C illustrate particular example shaft retainers 734. As shown by FIG. 14A, each of shaft retainers 734 comprises bolt 830, magnet, plug 834 and ball 836. Bolt 830 comprises a threaded shaft 840 threaded through an internally threaded bore 760 of compression plate 724 and a polygonal head 842 to facilitate rotation of bolt 830. Bolt 830 further comprises an internal bore 844 to receive magnet 832 and plug 834. In the example illustrated, bore 844 is a blind hole. In other implementations, bore 844 may extend completely through bolt 830, wherein the open end of bolt 830 is capped or wherein magnet 832 is fixed and ball 836 is direct contact with the magnet 832.

Magnet 832 is received within bore 844 and is configured to magnetically attract and hold ball 836, either directly or indirectly. Plug 834 is received within bore 844 and retains magnet 832 in place. In some implementations, plug 834 may comprise a cap over the opening of bore 844. In some implementations, plug 834 may be omitted, such as where magnet 832 is adhesively or otherwise secured within bore 844. In some implementations, magnet 832 may comprise a permanent magnet. In some implementations, magnet 832 may comprise a selectively actuatable electromagnet.

Ball 836 comprises a sphere formed from a magnetic material or magnetically attractable material, such as a ferrous material. In some implementations, ball 836 may have a ferrous or metal core with a polymeric outer layer. In some implementations, ball 836 may be entirely formed from a metal or ferrous material. In some implementations, ball 836 may comprise a steel chrome ball. Ball 836 is magnetically held to the lower face of bolt 830, or to a lower face of an end cap of bolt 830, or to a lower face of magnet 832. Ball 836 is sized for partial reception within the hollow interior 41 of the top axial end of arrow shaft 40. Ball 836 provides a spherical surface for engaging the top of arrow shaft 40.

As discussed above with respect to spherical surface of tip 154, the spherical surface provided by ball 836 naturally centers arrow shaft 40 along the axis which is parallel to the compression axis 42, finding a potentially perfect or ideal center of the tube forming shaft 40. The spherical surface further facilitates rotation of the top of arrow shaft 40 about the spherical surface during compression. Because ball 836 is magnetically held in place, ball 836 may itself rotate to further facilitate rotation of the arrow shaft 40 about the axis that extends parallel to compression axis 42 and the pivoting of the top of arrow shaft 40 during compression.

Figure 14B:
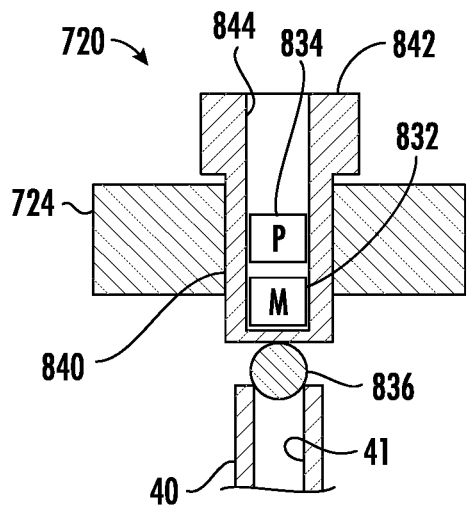
FIG. 14B is a sectional view of the individual shaft retainer of FIG. 14A, illustrating extension of the individual shaft retainer to accommodate a shorter arrow shaft.
Figure 14C:
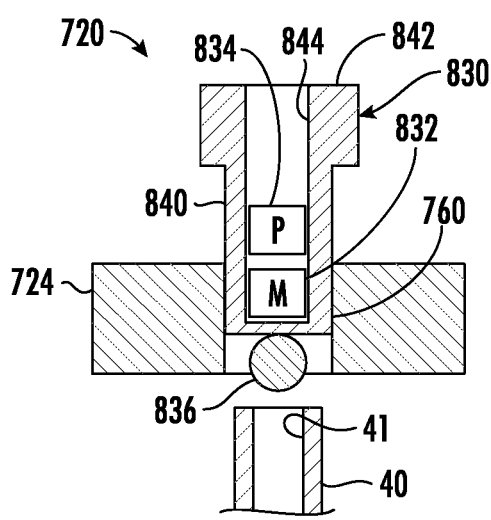
FIG. 14C the sectional view of the individual shaft retainer of FIG. 14A, illustrating retraction of the individual shaft retainer to release the arrow shaft.

FIGS. 14A, 14B and 14C illustrate the adjustability of shaft retainer 734. FIG. 14A illustrates ball 836 being magnetically held to face 846 of bolt 830 and being partially received within interior 41 of the top of arrow shaft 40, seated within arrow shaft 40. FIG. 14A further illustrates bolt 830 at a first vertical position, supporting ball 836 in engagement with arrow shaft 40.

FIG. 14B illustrates bolt 830 at a second different vertical position in which bolt 830 exists extended further towards compression plate 726 and supports ball 836 at a vertical position closer to compression plate 726 to accommodate loading of a shorter arrow shaft 40. As a result, different arrow shafts 40 having different lengths may be loaded between plate 724 and 726.

FIG. 14C illustrates bolt 830 at a third different vertical position in which bolt 830 is retracted further away from compression plate 726. In the example illustrated, face 846 is retracted to an extent such that ball 836 is partially received within bore 760. In the retracted state shown, the arrow shaft 40, previously engaged by ball 836, is released and may be withdrawn from arrow shaft weak spine detector 720.

In the example illustrated, each of bolts 830 may be vertically repositioned relative to compression plate 724 by rotating bolt 830 which results in bolt 830 axially moving due to the helical threads. Because each individual bolt 830 may be individually rotated, individual arrow shafts may be individually loaded and/or withdrawn without movement of compression plate 726. In other implementations, shaft retainers 734 may have a configuration similar to shaft retainer 334, where each bolt 830 is vertically slidable through bore 760 (no threaded inter-engagement) and is held by a transverse retaining pin 376. In such implementations, each bolt 830 may still further include magnet 832 and the magnetically held ball 836.

Figure 15:
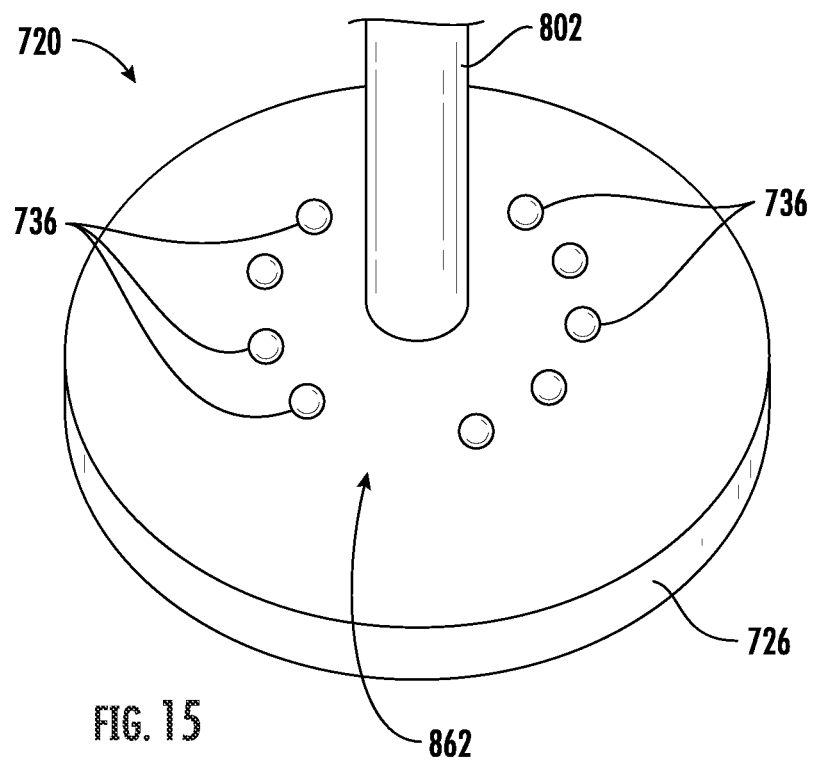
FIG. 15 is a fragmentary top perspective view of a top side of a bottom compression plate of the example arrow shaft weak spine detector of FIG. 9.
Figure 16:
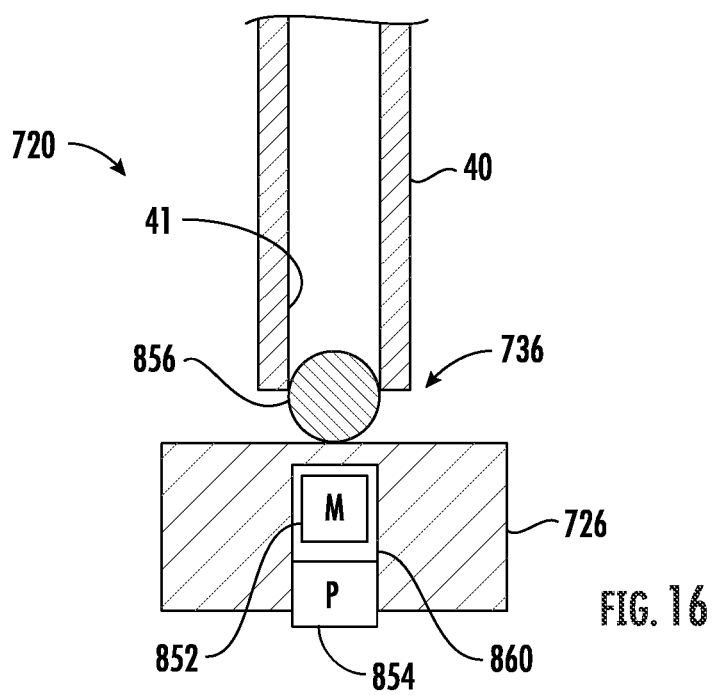
FIG. 16 is a sectional view of an individual shaft retainer supported by the example bottom compression plate of the example arrow shaft weak spine detector of FIG. 9.

FIGS. 15 and 16 illustrate arrow shaft retainers 736. Each arrow shaft retainer 736 corresponds to a vertically opposite one of arrow shaft retainers 734. Each arrow shaft retainer 736 comprises magnet 852, plug 854 and ball 856.

As shown by FIG. 16, magnet 852 is received within a blind hole or bore 860 extending from a lower side of compression plate 726. FIG. 15 illustrates a region 860 along the top surface of compression plate 726 which omits its associated ball 862, wherein the top surface is smooth. Magnet 852 has a sufficient magnetic strength to magnetically hold ball 856 in place relative to compression plate 726 before and during compression of arrow shaft 40. In some implementations, bore 860 may alternatively extend completely through plate 726, wherein the bore is covered by a cap or other structure. In some implementations, magnet 852 may be secured in place such magnet 852 forms a portion of the surface of compression plate 726, wherein ball 856 is magnetically held in direct contact with the surface of the magnet 852. In some implementations, magnet 852 may comprise a permanent magnet. In some implementations, magnet 852 may comprise a selectively actuatable electromagnet.

Plug 854 assists in retaining magnet 852 in place. In some implementations, plug 854 may be omitted where magnet 852 is adhesively bonded or held in place within bore 860. In some implementations, plug 854 may be omitted where magnet 852 is snapped and held in place by surfaces within the interior of bore 860 or where magnet 852 is co-molded into the material composition of plate 726.

Ball 856 is similar to ball 836 of shaft retainer 734. Ball 856 comprises a sphere at least partially formed from a magnetic material or magnetically attractable material, such as a ferrous or metal material. In some implementations, ball 856 may comprise a steel chrome ball.

Ball 856 is magnetically held to the upper face of plate 726, or to a lower face of an end cap of bore 860, or to a lower face of magnet 832. Ball 856 is sized for partial reception within the hollow interior 41 of the top axial end of arrow shaft 40. Ball 856 provides a spherical surface for engaging the bottom of arrow shaft 40.

As discussed above with respect to the spherical surface of tip 158, the spherical surface provided by ball 856 naturally centers arrow shaft 40 along the axis which is parallel to the compression axis 42, finding a potentially perfect or ideal center of the tube forming shaft 40. The spherical surface further facilitates rotation of the bottom of arrow shaft 40 about the spherical surface during compression. Because ball 856 is magnetically held in place, ball 856 may itself rotate to further facilitate the rotation of arrow shaft 40 about the axis extending between balls 836 and 856 or the pivoting of the bottom of arrow shaft 40 during compression. Although shaft retainers 734 and 736 are described in the context of being employed in arrow shaft weak spine detector 720, in other implementations, shaft retainers 734 and/or shaft retainers 736 may also be employed in either of arrow shaft weak spine detectors 420 and 620, in place of arrow shaft retainers 434 and 436, respectively.

As shown by FIGS. 9 and 10, actuator 808 is captured between lower platform 810 and middle platform 816. Actuator 808 is coupled to vertical shaft 802 and compression plate 724. Actuator 808 is configured to vertically move shaft 802 and compression plate 724 along axis 42 to compress the arrow shafts 40 captured between plate 726 and 724. In the example illustrated, actuator 808 comprises an electrically powered actuator, such as an electric solenoid secured to a lower end of shaft 802 by universal joint 830.

In other implementations, actuator 808 may comprise manually powered actuators, such a crank and associated geared transmission (rack and pinion for example), a manual jack, or a manually pumped hydraulic jack. In some implementations, actuator 808 may comprise a powered mechanism such as an electric motor that rotatably drives a threaded shaft or a worm gear to vertically raise and lower shaft 802, a hydraulic or pneumatic cylinder-piston assembly and hydraulic or pneumatic pump to raise and lower shaft 802 or the like.

Figure 17:
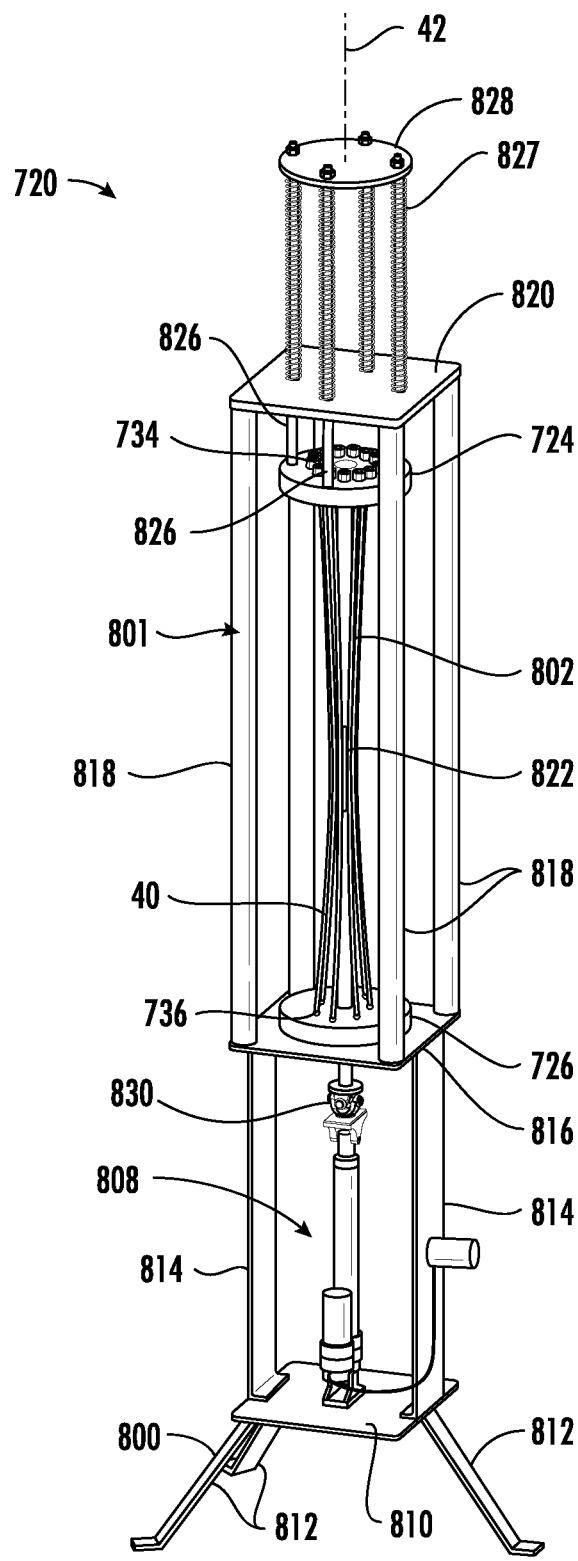
FIG. 17 is a perspective view of the example arrow shaft weak spine detector of FIG. 9, illustrating the retained arrow shafts in a bent or compressed state.
Figure 18:
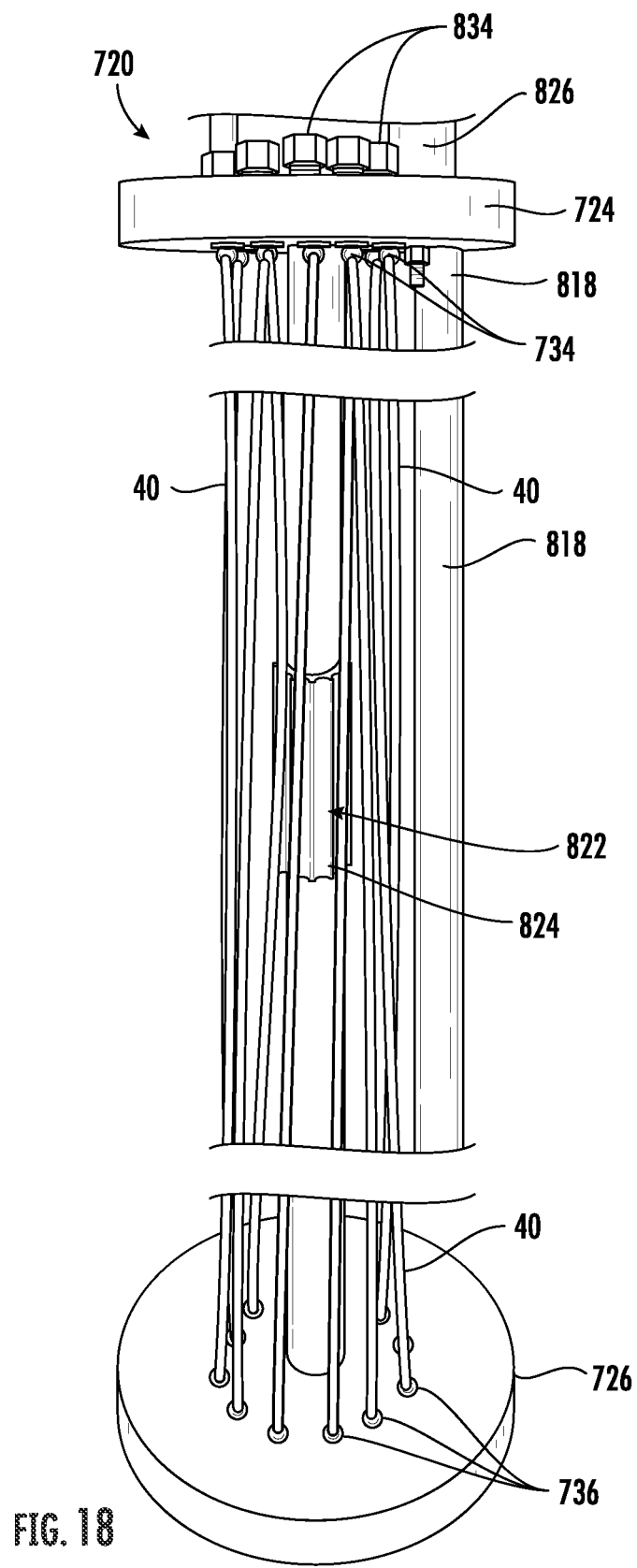
FIG. 18 is an enlarged perspective view of the example arrow shaft weak spine detector of FIG. 17 illustrating random bending or bowing of the individual arrow shafts while in the compressed state.
Figure 19:
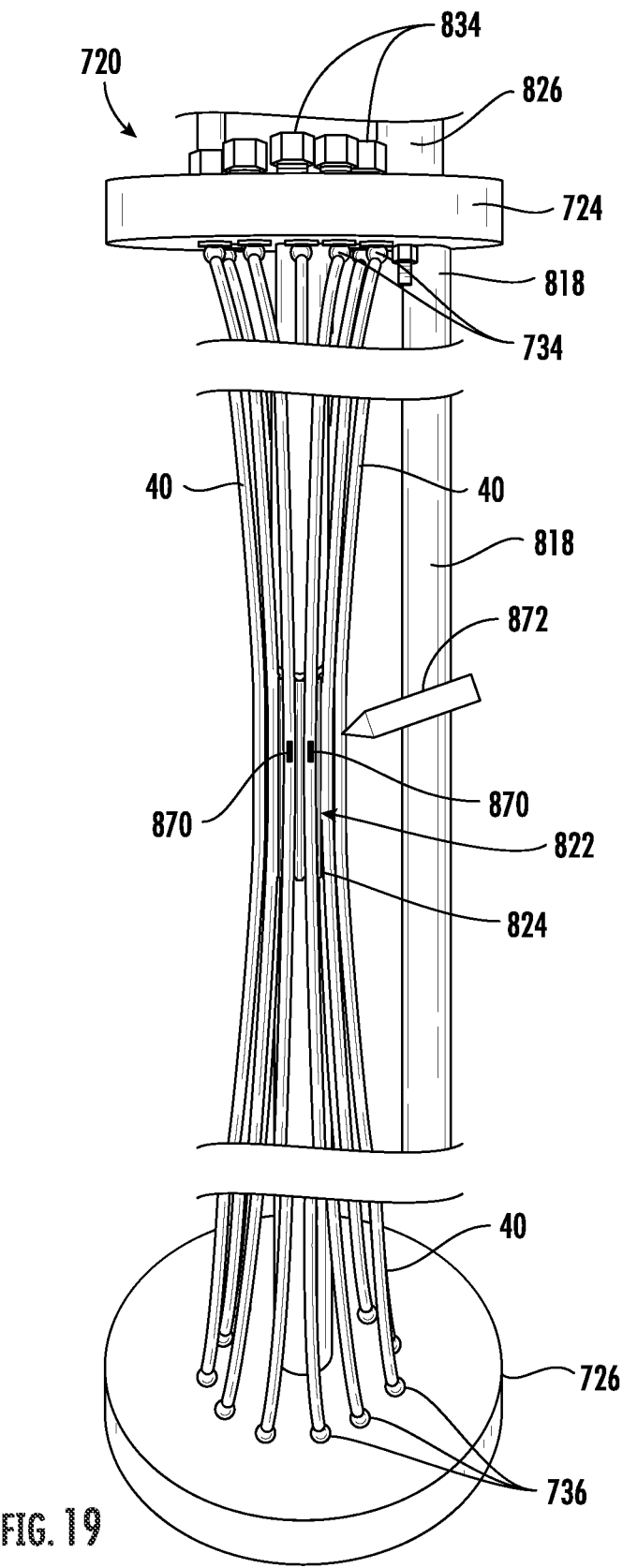
FIG. 19 is an enlarged perspective view of the example arrow shaft weak spine detector of FIG. 17 illustrating marking of the arrow shafts after the arrow shafts have been rotated to align the bowing of the arrow shafts with vertical channels of a sleeve supported along a compression axis of the detector.

FIGS. 17, 18 and 19 illustrate the compression of arrow shafts between plates 724 and 726 by actuator 808. FIG. 17 illustrates shaft 802 and compression plate 724 being lowered by actuator 808, causing arrow shafts 40 to deflect or bend. As shown by FIG. 18, during such compression of arrow shafts 40, different arrow shafts 40 may deflect or bend in different directions due to the different locations of the weak spots of the different arrow shafts. For example, a first arrow shaft may have a weak spot located on a side of the shaft closest to compression axis 42. This particular arrow shaft may bend at the weak spot, resulting in the arrow shaft bowing outwardly away from the compression axis 42. A second arrow shaft may have a weak spot located on a side of the shaft farthest away from compression axis 42. This particular arrow shaft may bend at the weak spot, resulting in the arrow shaft bowing inwardly towards the compression axis 42. The different directions at which the different arrow shafts bend may make the precise identification of the direction of deflection difficult and may make marking of the appropriate spot on the arrow shafts difficult.

As shown by FIG. 19, because the shaft retainers 734 and 736 facilitate rotation of the individual arrow shafts about their individual axes extending between balls 836 and 856 while under compression, an operator may manually rotate the arrows such that all of the arrows bow in generally the same direction, towards compression axis 42. To further facilitate such rotation, the degree to which the arrow shaft 40 are compressed may be temporarily reduced.

To ensure that each of the shafts 40 are rotated such that all the shafts 40 bow at the same angle towards compression axis 42, each arrow shaft 40 may be rotated while under a lower degree of compression and then may be compressed to a greater extent to move the arrow shafts into close proximity with the channels 824 of sleeve 822. Iteratively rotating each individual shaft 40 may continue until each of the shafts 40 is fully aligned and received within the corresponding channels 824 of sleeve 822 under full compression.

Once each of the individual shafts 40 have been aligned with their corresponding channels 824 of sleeve 822, each of the arrow shafts 40 may be manually marked with a mark 870 on a side of the shaft 40 directly opposite to the corresponding channel 824 with a marker 872. Once each of the shafts 40 has been appropriately marked to indicate either the bowing side of the shaft or the bending side shaft, the arrow shafts may be withdrawn from between compression plate 724 and 726. Actuator 808 may be actuated to raise shaft 802 and compression plate 724, with the assistance of springs 827 when provided, until arrow shafts 40 are in a state of reduced compression or no compression. The individual arrow shafts may then be withdrawn by further individual rotation of the bolts 842 to withdraw balls 836 from the axial ends of the individual shafts 40. Alternatively shaft 802 and compression plate 724 may be raised to an extent such that the balls 836 are concurrently withdrawn from all of the arrow shafts 40. An archer may then subsequently use the mark 870, which indicates the deflection tendencies of the particular arrow, to preemptively adjust his or her aim of the arrow to account for such anticipated deflection of the arrow during firing of the arrow.

Although arrow shaft weak spine detector 720 is illustrated and described as using an actuator to move shaft 802 and a connected compression plate 724 to compress the arrow shafts between compression plates 724 and 726, in other implementations, detector 720 may alternatively compress the arrow shafts with mechanisms similar to those described above with respect to detectors 420 and 620. For example, compression plate 724 and/or compression plate 726 may be raised or lowered by the associated actuators to move one or both of the compression plates along and relative to a shaft that slidably passes through such compression plates. In some implementations, an actuator above top platform 820 may be coupled to shaft 802 to raise and lower shaft 802 which is instead attached to compression plate 726 and which passes through compression plate 724. In such an implementation, the actuator would raise compression plate 726 to compress arrow shafts 40.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An arrow shaft weak spine detector comprising:
   a first plate;
   a second plate vertically spaced from the first plate to receive an arrow shaft therebetween, the second plate being movable along a first axis toward the first plate to compress the arrow shaft;
   a first shaft retainer supported by the first plate to engage a first axial end on the arrow shaft, the first shaft retainer being rotatable about a second axis coincident or parallel to the first axis, the first shaft retainer comprising a spherical surface to facilitate sideways bending of the arrow shaft during compression of the arrow shaft; and
   a second shaft retainer supported by the second plate to engage a second axial end of the arrow shaft, the second shaft retainer being rotatable about the second axis.

2. The arrow shaft weak spine detector of claim 1, wherein the first shaft retainer comprises a magnetically held ball.

3. The arrow shaft weak spine detector of claim 2, wherein the first plate supports an internal magnet opposite the ball.

4. The arrow shaft weak spine detector of claim 2, wherein the second shaft retainer comprises a second magnetically held ball.

5. The arrow shaft weak spine detector of claim 1, wherein the second plate is resiliently biased in a direction away from the first plate.

6. The arrow shaft weak spine detector of claim 1 further comprising a powered actuator to move the second plate towards the first plate.

7. The arrow shaft weak spine detector of claim 1, wherein the first spherical surface of the first shaft retainer is configured to partially project into a tubular interior of the arrow shaft.

8. The arrow shaft weak spine detector of claim 7, the second shaft retainer comprises a second spherical surface to facilitate bending of the arrow shaft during compression of the arrow shaft.

9. The arrow shaft weak spine detector of claim 1, wherein the first shaft retainer comprises a ball providing the spherical surface.

10. The arrow shaft weak spine detector of claim 1, wherein the first shaft retainer is movable relative to the first plate along the second axis.

11. The arrow shaft weak spine detector of claim 10, wherein the first shaft retainer is threaded to the first plate for movement along the second axis.

12. The arrow shaft weak spine detector of claim 1, wherein the second shaft retainer is movable relative to the second plate along the second axis.

13. The arrow shaft weak spine detector of claim 1, wherein the spherical surface is configured to bear against an axial rim of an arrow shaft while partially projecting into a tubular interior of the arrow shaft such that the axial rim of the arrow shaft is movable along the spherical surface in response to the arrow shaft bending such that its axis is no longer parallel to the first axis.

14. The arrow shaft weak spine detector of claim 1, wherein the first shaft retainer comprises the spherical surface on a first end of the first shaft retainer, and a non-spherical surface on a second end of the first shaft retainer, the second end being opposite the first end.

15. The arrow shaft weak spine detector of claim 1, wherein the spherical surface is magnetically held by the first plate.

16. The arrow shaft weak spine detector of claim 1, wherein a portion of the first shaft retainer is configured to be received within an axial end of the arrow shaft and wherein the spherical surface faces the first plate.

17. The arrow shaft weak spine detector of claim 1, wherein the spherical surface is configured to abut a rim of the arrow shaft while facing the second plate and partially projecting past the rim into an axial end of the arrow shaft.

18. An arrow shaft weak spine detector comprising:
    a first plate;
    a second plate vertically spaced from the first plate to receive an arrow shaft therebetween, the second plate being movable along a first axis toward the first plate to compress the arrow shaft;
    a first shaft retainer supported by the first plate to engage a first axial end on the arrow shaft, the first shaft retainer being rotatable about a second axis coincident or parallel to the first axis; and
    a second shaft retainer supported by the second plate to engage a second axial end of the arrow shaft, the second shaft retainer being rotatable about the second axis, wherein the first shaft retainer is one of a plurality of first shaft retainers supported by the first plate, wherein each of the plurality of first shaft retainers is rotatable about an axis parallel to the first axis and wherein the second shaft retainer is one of a plurality of second shaft retainers supported by the second plate, wherein each of the plurality of second shaft retainers is rotatable about an axis parallel to the first axis.

19. The arrow shaft weak spine detector of claim 18, wherein the second plate is movable along a shaft and wherein the plurality of first shaft retainers and the plurality of second shaft retainers each encircle the shaft.

20. The arrow shaft weak spine detector of claim 19 further comprising a plurality of vertical channels supported by the shaft and encircling the shaft, each of the channels being sized and located to receive a circumferential side of an arrow shaft supported by one of the first shaft retainers and one of the second shaft retainers.

21. The arrow shaft weak spine detector of claim 18, wherein each of the first shaft retainers and the second shaft retainers comprises a magnetically held ball.

22. An arrow shaft weak spine detector comprising:
a first plate;
a second plate vertically spaced above the first plate to receive an arrow shaft therebetween, the second plate being movable along a first axis toward the first plate to compress the arrow shaft;
a first shaft retainer supported by the first plate to engage a first axial end on the arrow shaft, the first shaft retainer being configured to project into a tubular interior of the arrow shaft at a first axial end of the arrow shaft; and
a second shaft retainer supported by the second plate and configured to project into the tubular interior of the arrow shaft at a second axial end of the arrow shaft, wherein at least one of the first shaft retainer and the second shaft retainer comprises a spherical surface to project into the tubular interior of the arrow shaft.

\* \* \* \* \*